(12) United States Patent
Chheda et al.

(10) Patent No.: US 7,003,626 B1
(45) Date of Patent: Feb. 21, 2006

(54) METHOD FOR STORING FORMAT SPECIFIC DATA IN A MICROCONTROLLER EXECUTION MEMORY

(75) Inventors: Nalin H. Chheda, Cerritos, CA (US); Philip S. Gordon, Santa Ana, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 364 days.

(21) Appl. No.: 10/449,989

(22) Filed: May 30, 2003

(51) Int. Cl.
  *G06F 13/00* (2006.01)
  *G06F 12/00* (2006.01)
(52) U.S. Cl. ........................................ 711/112
(58) Field of Classification Search ............... 711/4, 711/100, 101, 111, 112, 202, 203, 205–208; 360/48, 49, 51, 77.02, 77.04, 75, 77.05, 72.2, 360/78.04, 78.14
See application file for complete search history.

(56) References Cited

U.S. PATENT DOCUMENTS

| | | | |
|---|---|---|---|
| 5,271,018 A | 12/1993 | Chan | |
| 5,561,566 A | 10/1996 | Kigami et al. | |
| 5,822,142 A * | 10/1998 | Hicken | 360/53 |
| 5,983,309 A | 11/1999 | Atsatt et al. | |
| 6,091,559 A | 7/2000 | Emo et al. | |
| 6,137,644 A | 10/2000 | Hetzler et al. | |
| 6,233,106 B1 * | 5/2001 | Chambers | 360/48 |
| 6,239,937 B1 | 5/2001 | Troemel | |
| 6,256,160 B1 * | 7/2001 | Liikanen et al. | 360/48 |
| 6,282,041 B1 * | 8/2001 | Blumenau | 360/48 |
| 6,327,641 B1 * | 12/2001 | Xiao et al. | 711/112 |
| 6,393,511 B1 * | 5/2002 | Albrecht et al. | 711/4 |
| 6,445,525 B1 * | 9/2002 | Young | 360/51 |
| 6,560,052 B1 * | 5/2003 | Ng et al. | 360/48 |
| 6,591,339 B1 | 7/2003 | Horst et al. | |
| 6,757,119 B1 | 6/2004 | Leow et al. | |
| 6,898,044 B1 * | 5/2005 | Chheda | 360/75 |
| 2003/0065872 A1 * | 4/2003 | Edgar et al. | 711/4 |

\* cited by examiner

*Primary Examiner*—Matthew D. Anderson
*Assistant Examiner*—Michael Krofcheck
(74) *Attorney, Agent, or Firm*—Jason T. Evans, Esq.; Ramin Mobarhan, Esq.

(57) ABSTRACT

Format specific parameters may be selected in a disk drive comprising a control system and a plurality of disk surfaces each having a surface format for storing data, wherein at least one surface format is different than other surface formats and wherein the control system comprises a microcontroller having a microcontroller execution memory. The method for selecting these format specific parameters includes initializing the disk drive for operation, receiving a data transfer command, and selecting a disk surface for performing data transfer operations based on the received data transfer command. The method further includes generating a format specific data structure corresponding to the selected disk surface, storing the format specific data structure at a predetermined address in the microcontroller execution memory, and executing instructions for performing the data transfer operations using the microcontroller, wherein the instructions are executed using the stored format specific data structure.

6 Claims, 5 Drawing Sheets

METHOD FOR STORING FORMAT SPECIFIC DATA IN A MICROCONTROLLER EXECUTION MEMORY

FIELD OF THE INVENTION

This invention relates to sectors on disks in a disk drive. More particularly, the invention is directed to obtaining timing map data for split-sectors on a disk.

BACKGROUND OF THE INVENTION

Disk drives conventionally partition disk surfaces into logical zones for optimizing storage capacity by varying bit density within each of the logical zones. The zones may be visualized as concentric bands of tracks with a varying progression of bit density from band to band. Each zone stores a range of user data blocks which are addressed by a host computer using a logical block address (LBA). The disk drive comprises an intelligent control system which translates the host specified LBA into an internal address. As is known in the art, the internal address may result from a translation process that translates the LBA into an internal absolute block address (ABA) that is eventually translated into a physical sector address and track address.

The disk drive control system may maintain a set of zone tables where each table provides information about the zone including for example an address of the first user data block in the zone. Other parameters in the zone table enable the control system to determine in which zone a given user data block resides by searching the zone tables to locate the sector corresponding to the block address.

Additionally, the disk drive control system may maintain a set of timing map tables (sometime referred to as a hard-sector description table (HSDT) by those in the art) where each table describes a sector in terms of its timeout counter (TOC), the wedge the sector belongs to, sector splits and other data corresponding to a location of a selected sector on a disk surface. Additionally, the disk drive control system may maintain a second set of timing map tables containing the timing offsets of the preamble-field of each split sector in a zone or a set of zone on the disk surface. This data is then used by control system which searches for the data in the timing map table, to verify the correct positioning of the head over a desired portion of the disk surface. The timing map tables are also aligned with zone table boundaries for disk cylinders.

In most cases, the disk drive control system can accomplish the timing map tables searches without compromising performance because the timing map tables are stored in memory when the drive is initialized for operation and only one set of tables is required because each disk surface has an identical format. The highly competitive disk drive market has more recently driven initiatives to minimize cost by allowing for variations in surface format such that multiple sets of timing map tables may be required. Detrimentally, this could require increased memory for storing the tables and increased processor execution overhead to perform searches of the expanded tables.

Accordingly, what is needed is a method for obtaining timing-map data, while reducing the need for increased memory for storing the tables and the processor execution overhead.

SUMMARY OF THE INVENTION

This invention can be regarded as a method of selecting format specific parameters in a disk drive comprising a control system and a plurality of disk surfaces each having a surface format for storing data, wherein at least one surface format is different than other surface formats and wherein the control system comprises a microcontroller having a microcontroller execution memory. The method includes initializing the disk drive for operation, receiving a data transfer command, and selecting a disk surface for performing data transfer operations based on the received data transfer command.

The method further includes generating a format specific data structure corresponding to the selected disk surface, storing the format specific data structure at a predetermined address in the microcontroller execution memory, and executing instructions for performing the data transfer operations using the microcontroller, wherein the instructions are executed using the stored format specific data structure.

DETAILED DESCRIPTION OF THE INVENTION

Figure 1A:
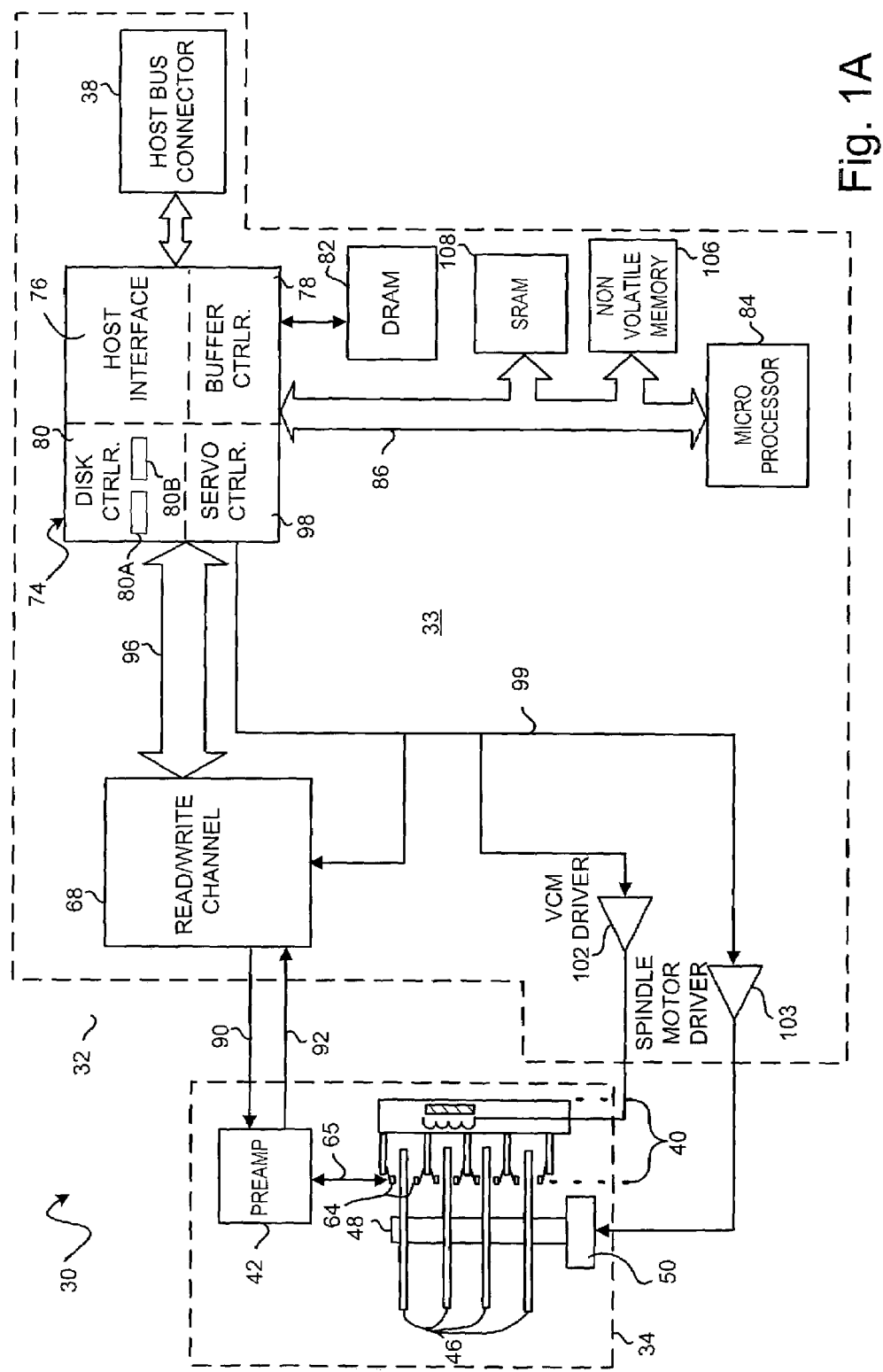
FIGS. 1A–B are block diagrams of a disk drive in which the invention may be practiced.

With reference to FIG. 1A, a block diagram of a disk drive 30 is shown in which the invention may be practiced. Disk drive 30 is connectable to a host computer (not shown) via host bus connector 38 for the transfer of commands, status and data. One suitable standard for such connection is the Advanced Technology Attachment (ATA) standard presently favored for desktop personal computers. Disk drive 30 comprises a Head Disk Assembly (HDA) 34, and a disk drive control system 33 mounted on a printed circuit board assembly (PCBA) 32.

As shown in FIG. 1A, HDA 34 comprises one or more disks 46 for data storage; a spindle motor 50 for rapidly spinning each disk 46 (four shown) on a spindle hub 48; and an actuator assembly 40 for swinging heads 64 in unison over each disk 46. The heads 64 are connected to a preamplifier 42 via a trace assembly 65 for reading and writing data on disks 46. Preamplifier 42 is connected to channel circuitry in control system 33 via read data line 92 and write data line 90.

The control system 33 comprises a read/write channel 68, host interface and disk controller (HIDC) 74, voice coil motor driver (VCM) 102, spindle motor driver (SMD) 103, microprocessor 84, and several memory arrays such as dynamic random access memory (DRAM) 82, static random access memory (SRAM) 108, and non-volatile memory 106. A serial bus 99 provides a medium for bi-directional transfer of digital data for programming and monitoring channel 68, VCM driver 102 and SMD 103. Host-initiated operations for reading and writing data in disk drive 30 are executed under control of microprocessor 84 connected to the controllers and memory arrays via a bus 86. Program code executed by microprocessor 84 maybe stored in memory arrays DRAM 82, SRAM 108 and non-volatile memory 106. DRAM 82 may also serve as a cache memory for data read from or written to the disk as is well known in the art.

During disk read and write operations, data transferred by preamplifier 42 is decoded and encoded by read/write channel 68. During read operations, channel 68 decodes data into digital bits transferred on a non-return-to-zero (NRZ) bus 96 to HIDC 74. During write operations, HIDC 74 provides digital data over the NRZ bus 96 to read/write channel 68 which encodes the data prior to its transmittal to preamplifier 42.

The HIDC 74 comprises a disk controller 80 for formatting and providing error detection and correction of disk data. The disk controller 80 includes a microcontroller 80a having execution memory 80b. The HIDC 74 further comprises a host interface controller 76 for responding to commands from host 36, and a buffer controller 78 for storing data which is transferred between disks 46 and host (not shown). Collectively the controllers 80 and 76 in HIDC 74 provide automated functions which assist microprocessor 84 in controlling disk operations.

The servo controller circuit 98 in HIDC 74 provides an interface between microprocessor 84 and actuator assembly 40 and spindle motor 50. Microprocessor 84 commands logic in servo controller 98 to position actuator 40 using a VCM driver 102 to precisely control the rotation of spindle motor 50 with a spindle motor driver 103.

Figure 1B:
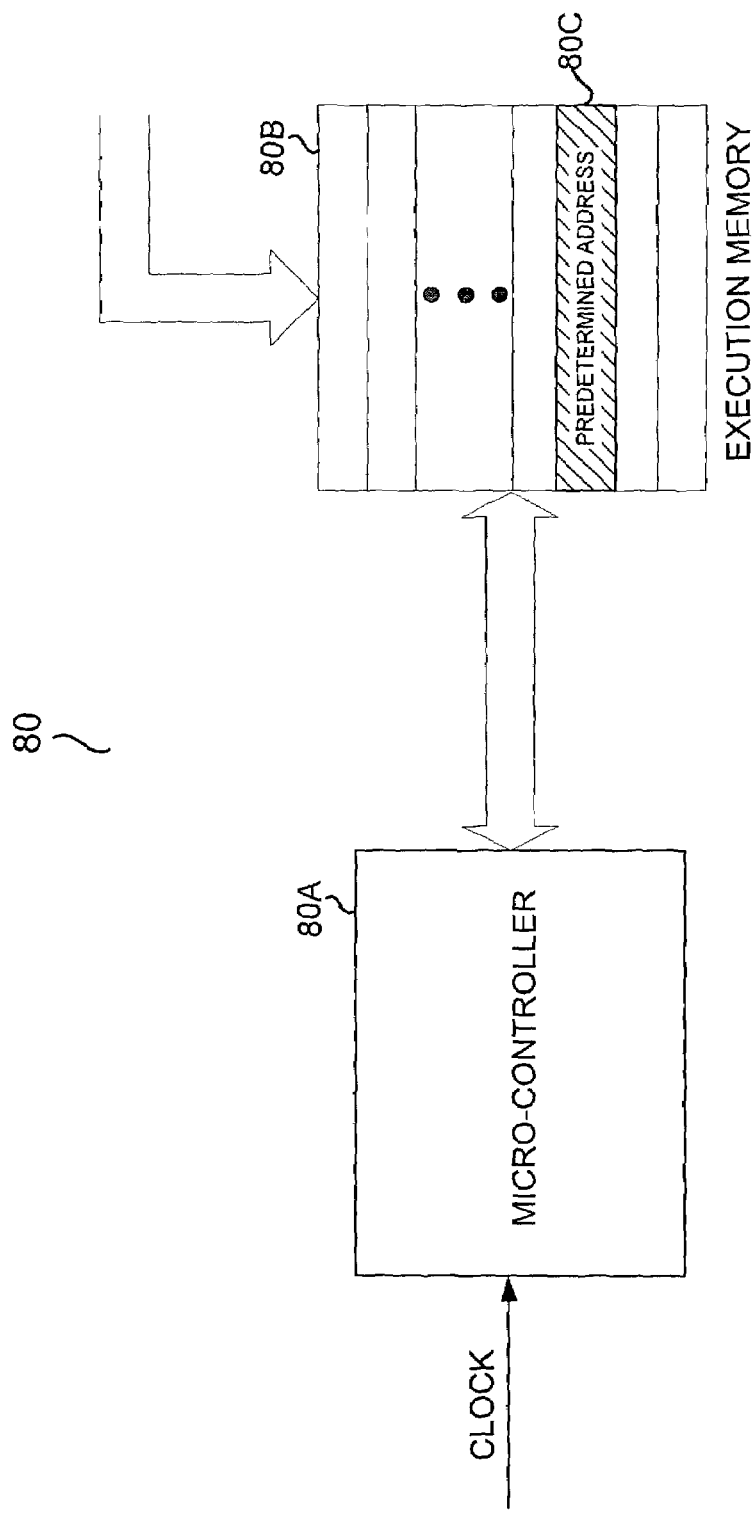
Figure 2:
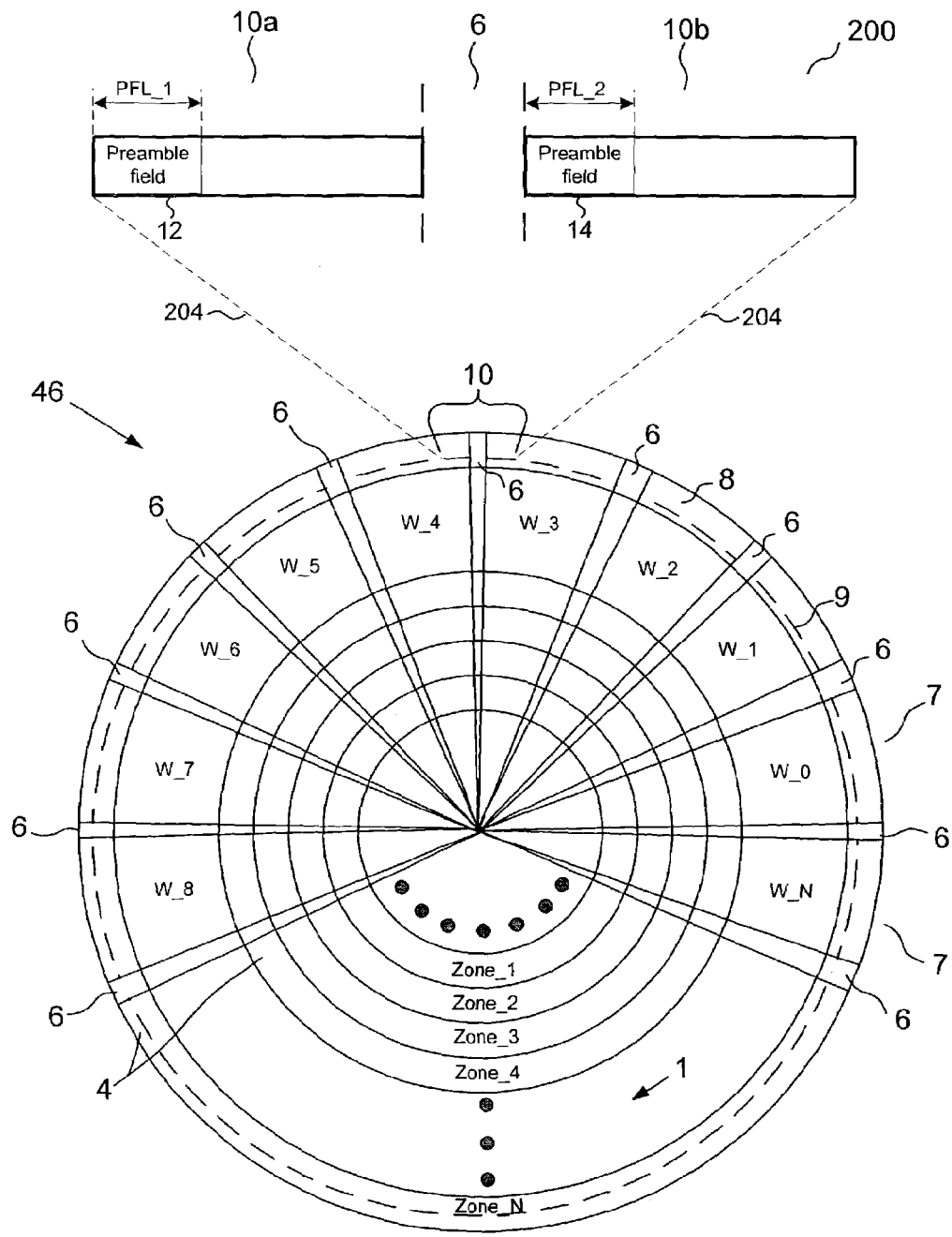
FIG. 2 illustrate a disk formatted for use with a disk drive employing an embodiment of the present invention.

FIG. 2 illustrate a disk 46 formatted for use with disk drive 30 shown in FIGS. 1A–B. The disk 46 has two surfaces 1 and 2 (not shown) that are of different surface formats from one another. Each of disk surfaces 1 and 2 is partitioned into radially-spaced concentric zones 4, such as zone_1 through zone_N, each of which have a number of tracks 8. Each track 8 comprises data sectors, such as data sector 9. Each disk surface further includes embedded servo sectors 6 disposed on the disk surfaces between angularly-spaced wedge-like areas 7, such as W_0 through W_N, for use in positioning the head 64 over a desired track 8 during write and read operations. Suitably, data sectors are recorded in the intervals between servo sectors 6 on each track 8. Servo sectors 6 are then sampled at regular intervals by channel 68, and are processed by servo controller 98 to provide position information to microprocessor 84 via bus 86. As also shown in FIG. 2, each track 8 contains at least one split-sector 10 that is partitioned by a servo sector 6, and includes a first portion located in a first wedge 7, such as W_4 and a split-portion located in an adjoining wedge 7, such as W_3.

Figure 3:
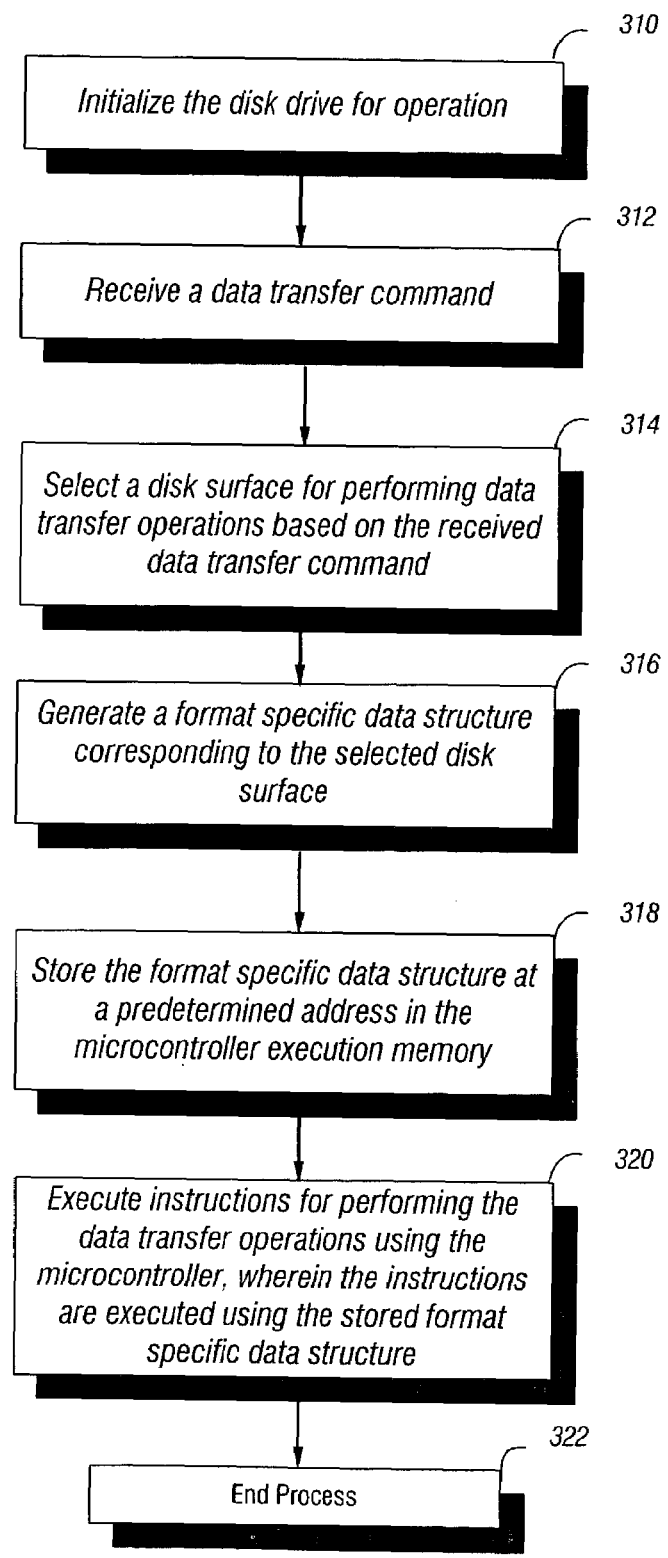
FIG. 3 is a flow chart illustrating a process used in an embodiment of the invention.

Referring to FIG. 3 in conjunction with FIG. 2, a process used in an embodiment of the invention is illustrated for selecting format specific parameters in a disk drive 30. As shown, the process begins at block 310 in which the disk drive 30 is initialized for operation. Next, in block 312, a data transfer command is received in the disk drive 30. Suitably, the data transfer command is received from a host computer (not shown) in communication with the disk drive 30.

Next, in block 314, a disk surface (such as disk surface 1 or 2) is selected for performing data transfer operations based on the received data transfer command. Next, in block 316, a format specific data structure is generated that corresponds to the selected disk surface, such as to disk surface 1, as described below and in greater detail in conjunction with FIG. 4A.

Next, in block 318, the generated format specific data structure is stored at a predetermined address 80c in the micro-controller execution memory 80b for access by the microcontroller 80a during the operations of the disk drive, as shown in FIG. 1B and described below and in greater detail in conjunction with FIG. 4B. Next, in block 320, instructions for performing the data transfer operations are executed using the microcontroller 80a. The instructions are executed using the stored format specific data structure of block 318. The flow then proceeds to block 322 in which the process ends.

Figure 4A:
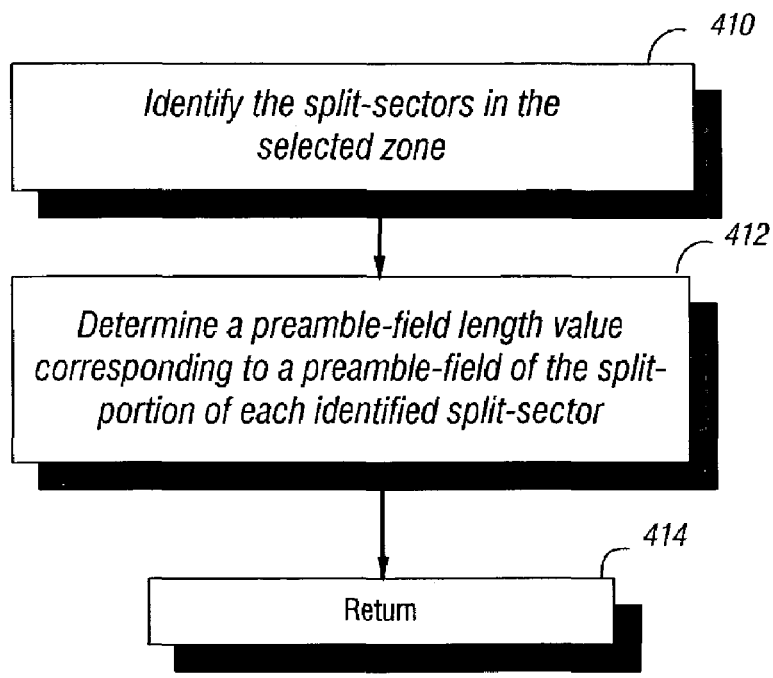
FIGS. 4A–B are flow charts further illustrating the process used in the embodiment of the invention shown in FIG. 3.

FIG. 4A, in conjunction with FIG. 2, illustrate in greater detail the generating process in block 316 of FIG. 3. As shown in FIG. 4, the process begins at block 410 by identifying the split-sectors 10 in tracks 8 of a selected portion of the selected surface 1. Suitably, the selected portion is one or more selected zones 4 in the selected surface 1.

For ease of illustrating the process of the present invention shown in FIG. 4A, an exemplary disk 46 with two surfaces 1 and 2 having different surface formats is provided in FIG. 2 and used throughout the detailed description. As shown by lines 204, the sector-diagram 200 is a linear representation of the split-sector 10 in a circular track 8 of surface 1 of disk 46), in zone_N. As shown in FIG. 2, split-sector 10 is partitioned by a servo sector 6 into two portions 10a and 10b wherein the portion 10a is located in a wedge W_4, and the split-portion 10b is located in the adjoining W_3. As also shown, each of portions 10a and 10b includes a preamble-field 12 and 14, respectively. Preamble-fields 12 and 14 in turn are characterized by a preamble-field length value, such as PFL_1 and PFL_2 values, respectively. It should be noted that the direct correlation between the length of a preamble-field and the length of time for passage of a preamble-field under the head during the rotation of a disk surface is well known in the art.

Returning to FIG. 4A, the process flow proceeds to block 412 in which the preamble-field length value corresponding to the preamble-field of the split-portion of each identified split-sector is determined. In the above example, the determined preamble-field length value corresponding to the preamble-field 14 of the split-portion 10b of the identified split-sector 10 is PFL_2. Next, the process flow proceeds to block 414 for returning to block 316 of FIG. 3. The overall process flow then proceed to in block 318 of FIG. 3 as described above.

Figure 4B:
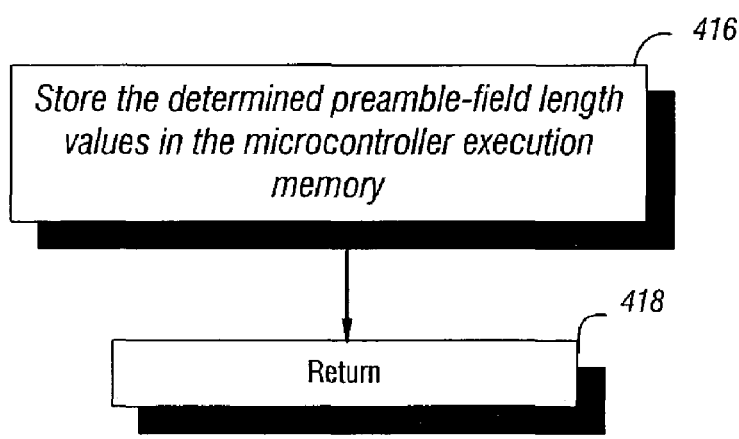

FIG. 4B, in conjunction with FIG. 2, illustrate in greater detail the generating process in block 318 of FIG. 3. As shown in FIG. 4B, the process begins at block 414 in which the determined preamble-field length values are stored in the microcontroller execution memory 80b. In the above example, the determined PFL_2 value corresponding to the preamble-field 14 of the split-portion 10b of the identified split-sector 10 is stored in the microcontroller execution memory 80b. Suitably, the determined preamble-field length values are first stored in SRAM 108 and then loaded into the predetermined address 80c of microcontroller execution memory 80b for access by the microcontroller 80a during the operations of the disk drive, as shown in FIG. 1B. Suitably the preamble-field length values are expressed as a byte-count, with each preamble-field length value residing in only one byte of memory. Next, the process flow then proceeds to block 418 for returning to block 320 of FIG. 3. The flow then proceeds to block 322 in which the overall process ends.

Currently in the art, the preamble-field length values for the split-portion of the split-sectors for all zones in a disk surface are determined prior to the initialization of the disk drive for operation, and stored in a table in a reserved portion on the disk surface. The values are then loaded into a relatively slower DRAM memory for subsequent use by the micro-controller. The highly competitive disk drive market has more recently driven initiatives to minimize cost by allowing for variations in surface format such that multiple sets of timing map tables may be required. Detrimentally, this could require increased memory for storing the tables and increased processor execution overhead to perform searches of the expanded tables. One advantage of the present invention over the prior art is that by determining the split-sector preamble-field length values for a selected portion (such as a zone) of a selected surface during the operations of the disk drive (i.e. on the fly), the need for allocation of larger storage areas for storage of all the preamble-field length values for all the zones of all differing surfaces in a disk drive is minimized.

What is claimed is:

1. A method for selecting format specific parameters in a disk drive comprising a control system and a plurality of disk surfaces each having a surface format for storing data, wherein at least one surface format is different than other surface formats and wherein the control system comprises a microcontroller having a microcontroller execution memory, the method comprising:

initializing the disk drive for operation;
   receiving a data transfer command;
   selecting a disk surface for performing data transfer operations based on the received data transfer command;
   generating a format specific data structure corresponding to the selected disk surface;
   storing the format specific data structure at a predetermined address in the microcontroller execution memory; and
   executing instructions for performing the data transfer operations using the microcontroller, wherein the instructions are executed using the stored format specific data structure;
   wherein the selected disk surface comprises a plurality of wedges and a plurality of zones traversing the wedges, each zone having at least one track having a plurality of sectors and at least one split-sector, wherein the generated data structure corresponds to a selected zone.

2. The method as claimed in claim 1, wherein each split sector in the track comprises a first portion located in a first wedge and a split-portion located in an adjoining wedge.

3. The method as claimed in claim 2, wherein the generating further comprises:

identifying the split-sectors in the selected zone; and
   determining a preamble-field length value corresponding to a preamble-field of the split-portion of each identified split-sector.

4. The method as claimed in claim 3, wherein the generating further comprises:

storing the determined preamble-field length values in the microcontroller execution memory.

5. The method as claimed in claim 4, wherein the determined preamble-field length values are stored in SRAM.

6. The method as claimed in claim 1, wherein the data transfer command is received from a host computer in communication with the disk drive.

* * * * *